United States Patent
Eriksson et al.

(10) Patent No.: US 10,904,219 B2
(45) Date of Patent: Jan. 26, 2021

(54) TRANSPORT RELAY IN COMMUNICATIONS NETWORK

(71) Applicant: Telefonaktiebolaget LM Ericsson (publ), Stockholm (SE)

(72) Inventors: Göran Eriksson, Stockholm (SE); Marcus Ihlar, Stockholm (SE); Daniel Lindström, Luleå (SE); Zaheduzzaman Sarker, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 227 days.

(21) Appl. No.: 16/080,344

(22) PCT Filed: Mar. 2, 2016

(86) PCT No.: PCT/EP2016/054372
§ 371 (c)(1),
(2) Date: Aug. 28, 2018

(87) PCT Pub. No.: WO2017/148509
PCT Pub. Date: Sep. 8, 2017

(65) Prior Publication Data
US 2019/0028440 A1    Jan. 24, 2019

(51) Int. Cl.
*H04L 29/06* (2006.01)

(52) U.S. Cl.
CPC ...... *H04L 63/0281* (2013.01); *H04L 63/0464* (2013.01); *H04L 63/0478* (2013.01); *H04L 63/0485* (2013.01)

(58) Field of Classification Search
CPC ............. H04L 63/0281; H04L 63/0464; H04L 63/0478; H04L 63/0485
See application file for complete search history.

(56) References Cited

U.S. PATENT DOCUMENTS

2016/0080335 A1 * 3/2016 Elzur .................. H04L 9/321
                                                    713/171

FOREIGN PATENT DOCUMENTS

| WO | 0163879 A1 | 8/2001 |
| WO | 2007023465 A1 | 3/2007 |

OTHER PUBLICATIONS

Fielding, R., et al., "Hypertect Transfer Protocol—HTTP/1.1", Network Working Group; Request for Comments: 2616; Obsoletes: 2068; Standards Track. IETF. The Internet Society. Jun. 1999. pp. 1-176.

(Continued)

*Primary Examiner* — Joseph P Hirl
*Assistant Examiner* — Ka Shan Choy
(74) *Attorney, Agent, or Firm* — Murphy, Bilak & Homilier, PLLC

(57) ABSTRACT

A relay-proxy device has first and second interfaces allowing connection to a first node and a second node respectively, wherein the relay-proxy device is configured with at least one key, and the relay-proxy device is operable to: receive a traffic flow in an encrypted transport protocol on the first interface; decrypt a first part of the traffic flow with said key, wherein a second part of the traffic flow cannot be decrypted with said key; perform a management function based on a content of the decrypted first part of the traffic flow; and forward at least the second part of the encrypted traffic flow to the second interface.

24 Claims, 10 Drawing Sheets

(56) References Cited

OTHER PUBLICATIONS

Hamilton, R., et al., "QUIC: A UDP-Based Secure and Reliable Transport for HTTP/2", Network Working Group; Internet-Draft; IETF Trust, 2015, pp. 1-31.
Naylor, David, et al., "Multi-Context TLS (mcTLS): Enabling Secure In-Network Functionality in TLS", Sigcomm 15, London, United Kingdom, Aug. 17-21, 2015, pp. 1-13.
Trammell, B., et al., "Requirements for the Design of a Substrate Protocol for User Datagrams (SPUD)", Network Working Group; Internet-Draft; IETF Trust, 2016, pp. 1-18.
"Performance-enhancing proxy", hltps://en.wikipedia.org/wiki/Performance-enhancing_proxy, Apr. 18, 2017, pp. 1-3.
"Transmission Control Protocol", DAPPA Internet Program Protocol Specification; Information Sciences Institute, Marina del Ray, California; RFC: 793, Sep. 1981, pp. 1-90.

\* cited by examiner

TRANSPORT RELAY IN COMMUNICATIONS NETWORK

TECHNICAL FIELD

This relates to a communications network, and in particular to a transport relay for use in such a system.

BACKGROUND

In some situations, a network is owned by a network provider, allowing service providers to connect users. A network provider will have the aggregated view of Internet Protocol (IP) traffic from lots of different sources and destinations, and will therefore have knowledge and control about the network condition. Hence it is the network provider's responsibility to ensure the best possible way to deliver IP packets from the services the user is using.

Meanwhile, it is a goal of any service provider to provide the best possible user experience. This means assuring robust and seamless service, even when the underlying network carrying the actual IP packets is unable to fulfil the service requirements. Service providers may try to achieve this by leveraging different congestion control and flow control mechanisms to provide differentiated treatment of flows and possibly customers.

When a network provider has access to the IP packets, it is able to use application layer information to identify particular traffic, and to manipulate transport layer protocol characteristics such as TCP congestion control, to police, shape and optimize traffic.

However, in light of increased user awareness of privacy and security concerns, service providers may wish to enable application level encryption, thereby making it technically costly for the network provider to perform application aware traffic management.

SUMMARY

According to an aspect of the invention, there is provided a method of operation of a relay-proxy device, wherein the relay-proxy device has first and second interfaces allowing connection to a first node and a second node respectively, and wherein the relay-proxy device is configured with at least one key. The method comprises: receiving a traffic flow in an encrypted transport protocol on the first interface; decrypting a first part of the traffic flow with said key, wherein a second part of the traffic flow cannot be decrypted with said key; performing a management function based on a content of the decrypted first part of the traffic flow; and forwarding at least the second part of the encrypted traffic flow to the second interface.

According to an aspect of the invention, there is provided a relay-proxy device comprising a processor and a memory, and having first and second interfaces allowing connection to a first node and a second node respectively, wherein the relay-proxy device is configured with at least one key. The memory contains instructions executable by the processor, such that the relay-proxy device is operable to: receive a traffic flow in an encrypted transport protocol on the first interface; decrypt a first part of the traffic flow with said key, wherein a second part of the traffic flow cannot be decrypted with said key; perform a management function based on a content of the decrypted first part of the traffic flow; and forward at least the second part of the encrypted traffic flow to the second interface.

According to an aspect of the invention, there is provided a relay-proxy device, having first and second interfaces allowing connection to a first node and a second node respectively, wherein the relay-proxy device is configured with at least one key. The relay-proxy device further comprises: a receiving module for receiving a traffic flow in an encrypted transport protocol on the first interface; a decrypting module for decrypting a first part of the traffic flow with said key, wherein a second part of the traffic flow cannot be decrypted with said key; a management function module for performing a management function based on a content of the decrypted first part of the traffic flow; and a forwarding module for forwarding at least the second part of the encrypted traffic flow to the second interface.

According to an aspect of the invention, there is provided a method of operation of a communication system comprising a first node, a second node, and a relay-proxy device, wherein the first node is connected to a first interface of the relay-proxy device and the second node is connected to a second interface of the relay-proxy device. The method comprises: transmitting a first part of a traffic flow from the first node through the relay-proxy device to the second node in an encrypted form, wherein the relay-proxy device is configured with at least one key for decryption of the first part of the traffic flow; and transmitting a second part of the traffic flow from the first node through the relay-proxy device to the second node, wherein the traffic flow is in an encrypted transport protocol such that the relay-proxy device is unable to decrypt the second part of the traffic flow.

According to an aspect of the invention, there is provided a communication system comprising a first node, a second node, and a relay-proxy device, wherein the first node is connected to a first interface of the relay-proxy device and the second node is connected to a second interface of the relay-proxy device, and wherein the first node, the second node, and the relay-proxy device comprise respective processors and memories. The memories contain instructions executable by the processors, such that the system is operable to: transmit a first part of a traffic flow from the first node through the relay-proxy device to the second node in an encrypted form, wherein the relay-proxy device is configured with at least one key for decryption of the first part of the traffic flow; and transmit a second part of the traffic flow from the first node through the relay-proxy device to the second node, wherein the traffic flow is in an encrypted transport protocol such that the relay-proxy device is unable to decrypt the second part of the traffic flow.

According to an aspect of the invention, there is provided a method of operation of a first network node in a communication system further comprising a second node, and a relay-proxy device connected between the first node and the second node. The method comprises: transmitting a first part of a traffic flow from the first node through the relay-proxy device to the second node in an encrypted form, wherein the relay-proxy device is configured with at least one key for decryption of the first part of the traffic flow; and transmitting a second part of the traffic flow from the first node through the relay-proxy device to the second node, wherein the traffic flow is in an encrypted transport protocol such that the relay-proxy device is unable to decrypt the second part of the traffic flow.

According to an aspect of the invention, there is provided a first network node in a communication system further comprising a second node, and a relay-proxy device connected between the first node and the second node. The first network node comprises a processor and a memory, the memory containing instructions executable by the processor, such that the first network node is operable to: transmit a first part of a traffic flow from the first node through the relay-proxy device to the second node in an encrypted form, wherein the relay-proxy device is configured with at least one key for decryption of the first part of the traffic flow; and transmit a second part of the traffic flow from the first node through the relay-proxy device to the second node, wherein the traffic flow is in an encrypted transport protocol such that the relay-proxy device is unable to decrypt the second part of the traffic flow.

According to an aspect of the invention, there is provided a first network node in a communication system further comprising a second node, and a relay-proxy device connected between the first node and the second node. The first network node comprises: a transmitting module for transmitting a first part of a traffic flow from the first node through the relay-proxy device to the second node in an encrypted form, wherein the relay-proxy device is configured with at least one key for decryption of the first part of the traffic flow; and for transmitting a second part of the traffic flow from the first node through the relay-proxy device to the second node, wherein the traffic flow is in an encrypted transport protocol such that the relay-proxy device is unable to decrypt the second part of the traffic flow.

According to other aspects of the invention, there are provided a computer program configured, when run on a computer, to carry out a method according to any one of the previous method aspects, and a computer program product comprising a computer readable medium and such a computer program.

This has the advantage that the network provider can obtain useful information about the traffic flow, without requiring access to confidential traffic data.

DETAILED DESCRIPTION

Figure 1:
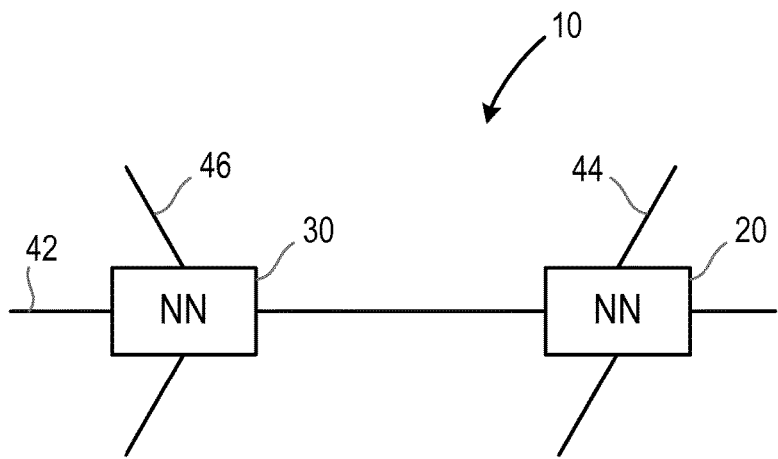
FIG. 1 illustrates a part of a communications network.

FIG. 1 illustrates a part of a communications network 10, comprising a first network node (NN) 20 and a second network node (NN) 30. The first network node 20 and the second network node 30 are connected by a communications link 40. The first network node 20 and the second network node 30 each have other connections 42, 44, 46, etc to other network nodes. Thus, the network 10 can link many network nodes.

In this illustrated example, the network 10 is an Internet Protocol (IP) network, providing IP links between network nodes. Further, in this illustrated example, the network 10 is owned and managed by a network provider.

Figure 2:
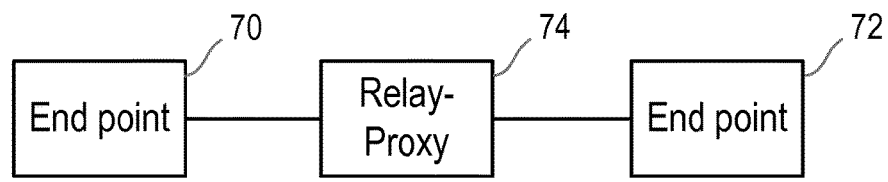
FIG. 2 illustrates a connection between two end points.

FIG. 2 illustrates a logical connection between two end points 70, 72, in a network of the general type shown in FIG. 1. As described in more detail below, a relay-proxy device 74 is included in the connection between the end points 70, 72.

Figure 3:
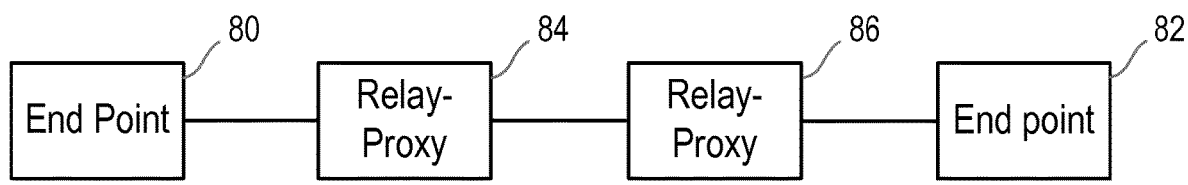
FIG. 3 illustrates a second connection between two end points.

FIG. 3 illustrates an alternative logical connection between two end points 80, 82, in a network of the general type shown in FIG. 1. As described in more detail below, two relay-proxy devices 84, 86 are included in the connection between the end points 80, 82.

Where two or more relay-proxies are connected in a serial fashion as shown in FIG. 3, they each have an interface for managing the cascading, used to publish and discover relay-proxies as well as provide and acquire the information needed for the relay-proxies to connect to each other and perform the transport relay-proxy role. In other embodiments, two or more relay-proxies are connected in a parallel fashion.

Although FIGS. 2 and 3 show illustrative examples in which each relay-proxy device 74, 84, 86 is connected between a single pair of end points, a relay-proxy can connect to multiple end points, for example supporting one or more servers and one or more clients simultaneously where the end points of each connection are acting as a server and client. In doing so, the relay-proxy maintains connection states for each connection.

The placement of the relay-proxy device (or each of the relay-proxy devices) should be such that it does not add delay or incur extra transport costs or similar. For example, a co-location with a radio scheduler may facilitates interaction with said functionality when this is appropriate.

Figure 4:
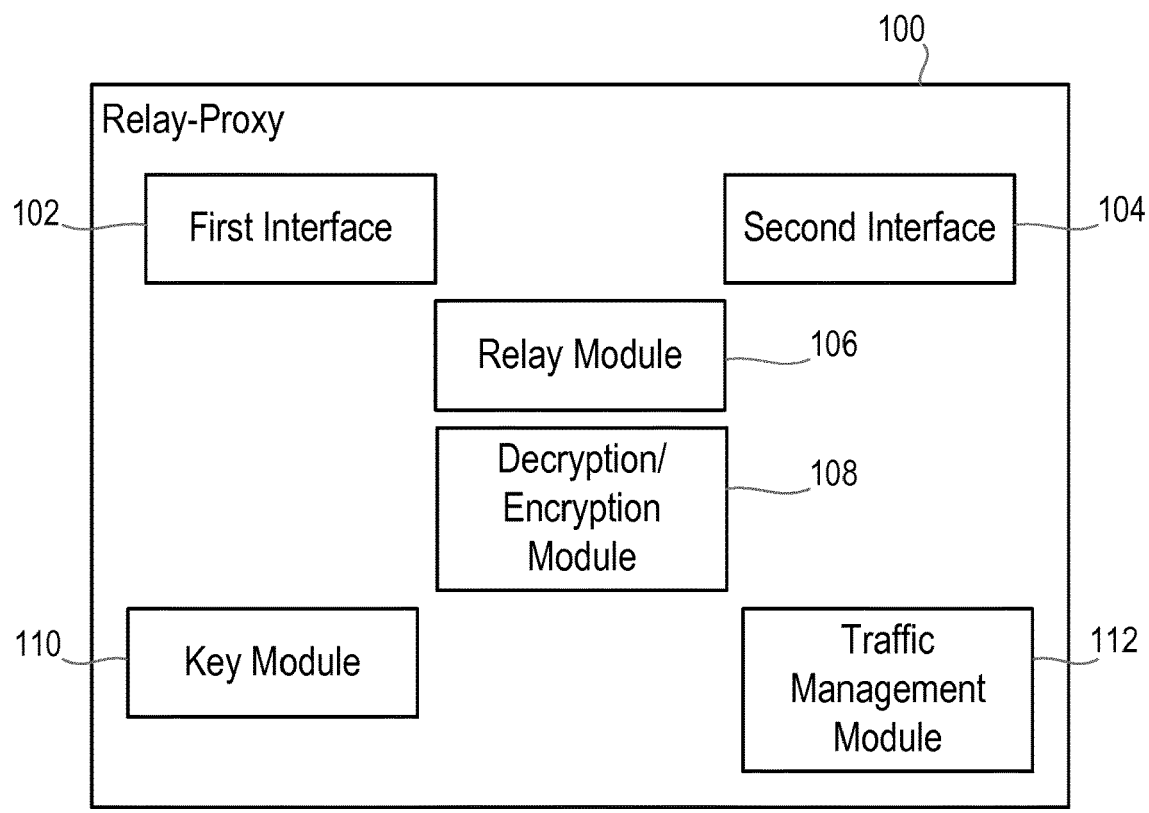
FIG. 4 illustrates a form of a transport relay-proxy device.

FIG. 4 illustrates a form of a relay-proxy device 100, which may for example be used as the relay-proxy device 74 shown in FIG. 2 or either of the relay-proxy devices 84, 86 shown in FIG. 3.

As shown in FIG. 4, the relay-proxy device 100 has a first interface 102, for connection to a first other node, that is, for connection directly or indirectly to a first end point. Also, the relay-proxy device 100 has a second interface 104, for connection to a second other node, that is, for connection directly or indirectly to a second end point.

Thus, when the relay-proxy device 100 is used as the relay-proxy device 74 in FIG. 2, the first interface 102 is connected directly or indirectly to the first end point 70, while the second interface 104 is connected directly or indirectly to the second end point 72.

When the relay-proxy device 100 is used as the relay-proxy device 84 in FIG. 3, the first interface 102 is connected directly or indirectly to the first end point 80, while the second interface 104 is connected to the relay-proxy device 86, and thus connected indirectly to the second end point 82.

When the relay-proxy device 100 is used as the relay-proxy device 86 in FIG. 3, the first interface 102 is connected to the relay-proxy device 84, and thus connected indirectly to the first end point 80, while the second interface 104 is connected directly or indirectly to the second end point 82.

The relay-proxy device 100 also includes a relay module 106, for passing traffic to and from the first interface 102 and the second interface 104.

The relay-proxy device 100 also includes a decryption/encryption module 108, for decrypting and encrypting traffic, as discussed in more detail below.

The relay-proxy device 100 also includes a key module 110, for managing keys for use in the decryption/encryption module 108, as discussed in more detail below.

The relay-proxy device 100 also includes a traffic management module 112, for performing traffic management functions, as discussed in more detail below.

Figure 5:
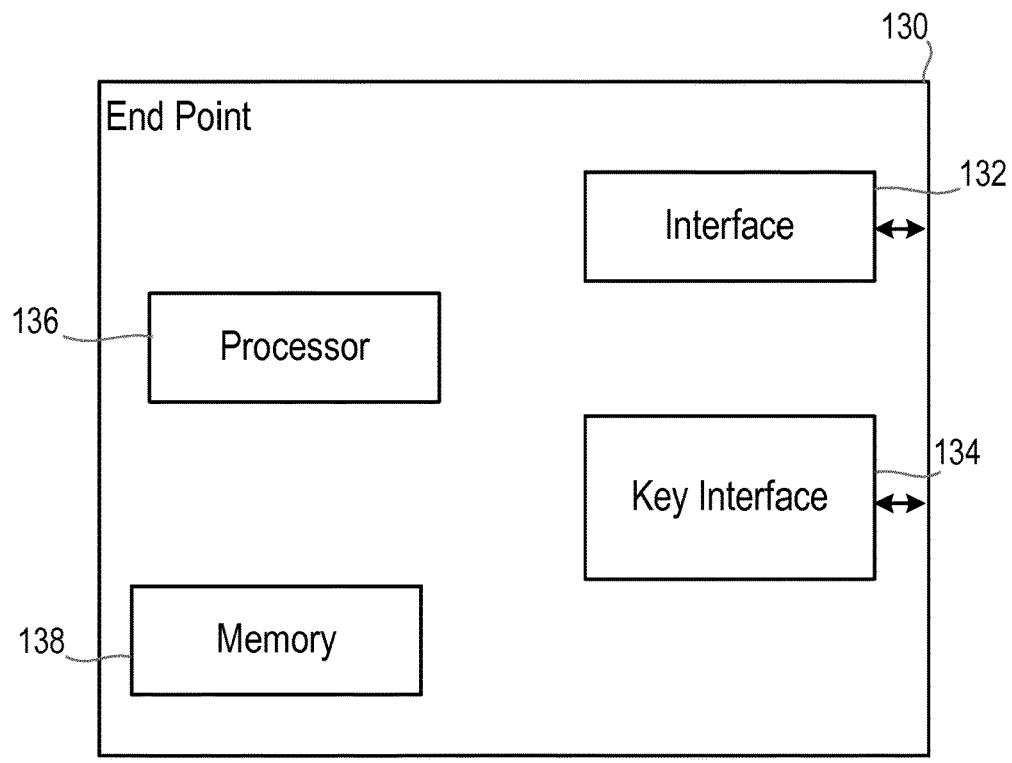
FIG. 5 illustrates a form of an end point device.

FIG. 5 illustrates a form of an end point device 130, which may for example be used as either of the end points 70, 72 shown in FIG. 2 or either of the end points 80, 82 shown in FIG. 3.

As shown in FIG. 5, the end point device 130 includes an interface 132, which may provide a traffic connection to any other network node.

The end point device 130 also includes a key interface 134, for receiving and managing keys, as described in more detail below.

The end point device 130 also includes a processor 136 for performing functions as described in more detail below, for example on the basis of program instructions stored in a memory 138.

As described in more detail below, the function of the relay-proxy device or devices is to provide the network provider with enough information to operate the network easily, without giving up the service provider's control over the complete user experience and without compromising user confidentiality and privacy.

This is achieved by introducing a layered security approach in the transport layer where the relay-proxy has access to a subset of the encrypted protocol fields but does not actually terminate the end-to-end transport flow. The subset of the protocol fields, to which the relay-proxy has access, is determined by the service provider. This layered security approach allows the end points to use different keys to encrypt the transport protocol header and payload. The fields that the applications do not want the relay-proxy to manipulate are protected using a separate set of keys from the overall transport security session.

Thus, even if the relay-proxy device has access to a certain portion of the data that the users are communicating with a server, the confidentiality and privacy of the user and the service provider will be intact as they decide what to disclose and what not to disclose.

The relay-proxy device operates with a consent (that can be configured and even managed) from the service provider, and hence the different service providers using the network can still control different aspects of the user experience such as congestion control and stream priority. Moreover, the service provider can use the network functions exposed to them.

However, the network provider has information about the traffic going through their network, allowing it to more efficiently manage the network function, compared with a situation in which it only sees the aggregated encrypted (and possibly padded) transport packets. This is achieved without requiring a function such as Deep Packet Inspection to know about the traffic being carried.

In some embodiments, as described below, the transport relay-proxy interacts with origin servers and clients, as seen within the interaction mode of a protocol such as the Quick UDP Internet Connections (QUIC) protocol, which is a transport layer network protocol that supports multiplexed connections between two endpoints over the User Datagram Protocol (UDP), and provide a high level of security protection. However, this server and client may be both clients or both servers in other contexts, and the use of the transport relay-proxy is applicable to peer-to-peer interactions.

Figure 6:
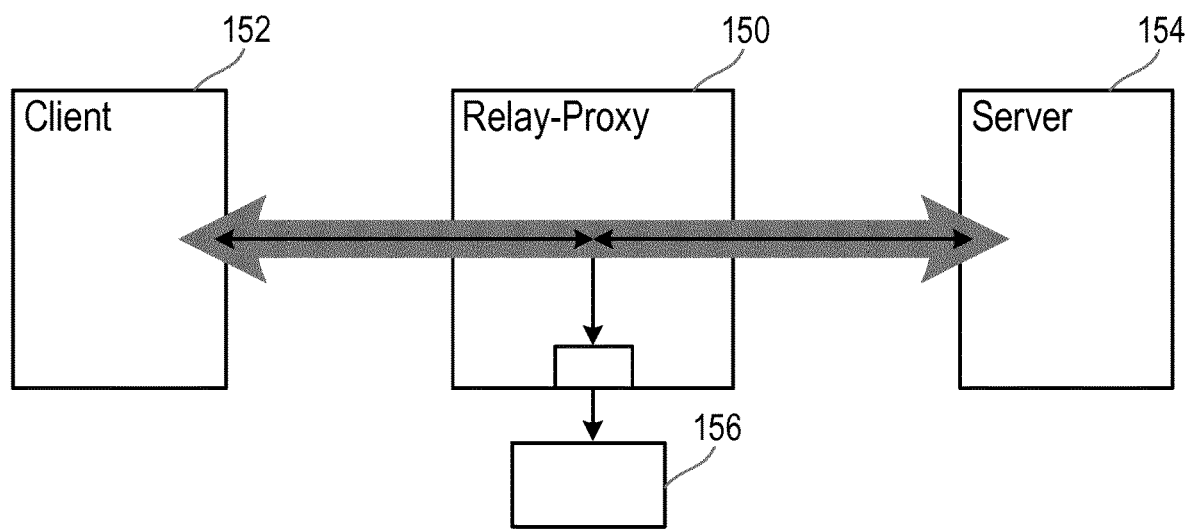
FIG. 6 illustrates a first possibility for including a relay-proxy device between two end point devices.

In some embodiments, as shown in FIG. 6, the transport relay-proxy 150 is "on-path", meaning that all of the traffic from the client user 152 to the server 154, and from the server 154 to the client 152, goes through the relay-proxy 150. The relay-proxy 150 also connects to, or includes, a network management function or network resource function 156, which is able to perform or enable functions for shaping or policing traffic or functions for scheduling traffic for delivery over a transport link, such as a radio link, as examples. Thus, the relay-proxy may receive configuration instructions from the network management function, which contains a policy engine.

As mentioned previously, the relay-proxy 150 differs from traditional HyperText Transfer Protocol (HTTP) proxies in that it does not terminate the application layer protocol. Furthermore, it is assumed that the application protocol handles traditional transport functions such as flow control and congestion control. In the case of an "on-path" relay-proxy, as shown in FIG. 6, the relay-proxy 150 may have explicit functions to handle the traffic from certain application and transport layer combinations, for example HTTP/2 over QUIC, in a different way from the rest of the traffic passing through it.

In other embodiments, the relay-proxy device may be explicitly configured by an origin server to be involved in the exchange of data between a client and the origin server, and thus acts as a "reverse proxy". One embodiment of a reverse proxy relies on application signalling such as in the HTTP protocol using difference re-direction methods.

Figure 7:
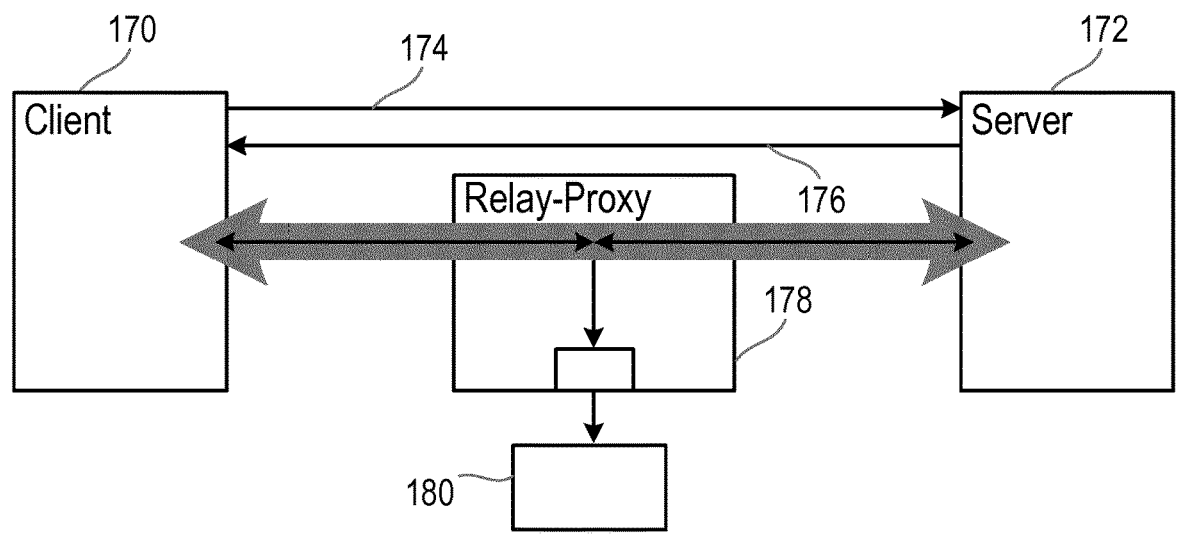
FIG. 7 illustrates a second possibility for including a relay-proxy device between two end point devices.

Thus, as shown in FIG. 7, a client 170 sends a HTTP GET message 174 to an origin web server 172. In response, the origin server 172 sends a message 176 to the client, explicitly redirecting the client to the relay-proxy 178, and thereby deliberately including it in the path to the client. Thus, subsequent transactions will be addressed to the relay-proxy 180, with the destination address will be specified in a protocol field. Again, the relay-proxy 178 also connects to, or includes, a network management function or network resource function 180, which is able to perform or enable functions for shaping or policing traffic or functions for scheduling traffic for delivery over a transport link, such as a radio link, as examples. Thus, the relay-proxy may receive configuration instructions from the network management function, which contains a policy engine.

In another realisation, the client is configured to use a proxy or said proxy is discovered by the client, the client sending all outgoing requests via said proxy.

Figure 8:
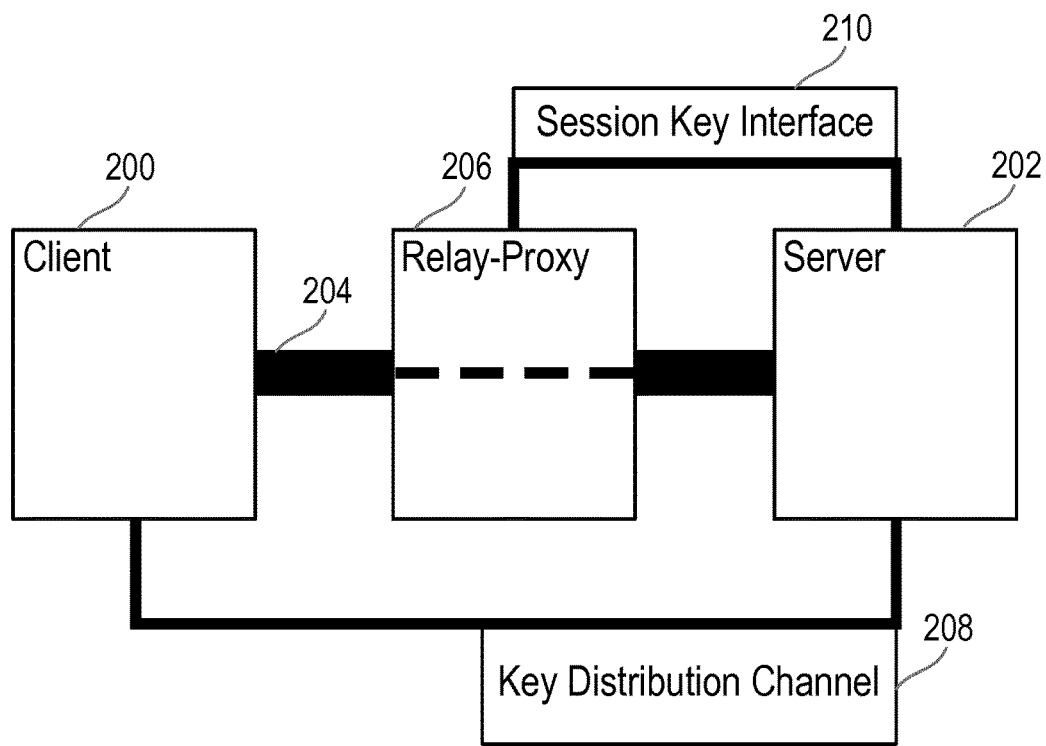
FIG. 8 illustrates interfaces between a relay-proxy device and two end point devices.

FIG. 8 illustrates one possible arrangement of interfaces to share session keys and data integrity for the multi-layer encryption approach described herein.

In this illustrated example, the client 200 and the server 202, which are transmitting application data 204, may decide to share the information about flow priority, transport requirements, background traffic etc. with the relay-proxy device 206. The relay-proxy 206 then can use such information to tune the network functions, such as use different scheduler for different priory flows, throttle or shape the background traffic etc. As described here, this shared information is only visible to the relay-proxy that the service provider has configured.

In this illustrated example, the server 202 establishes a key distribution channel 208 with the client 200 for sharing one or more keys. In addition, the server 202 establishes a session key interface 210 with the relay-proxy device 206 for sharing one or more keys.

In this example, the server 202 sends the relevant key or keys from its key interface 132 as shown in FIG. 5, and the key or keys is/are received in the key module 110 (as shown in FIG. 4) of the relay-proxy device 206.

As mentioned above, the transport relay-proxy may have one or more keys depending on the level of security desired by the service provider. The service provider also controls the life span of a key.

In other examples, the relay-proxy can have one or more keys pre-installed, for instance in a trusted processing module (such as the key module 110 shown in FIG. 4). The relay-proxy can also indicate the need for a key or set of keys from the authoritative server, or from another server belonging to the service provider, for a certain connection. In such examples, the relay-proxy can receive the relevant key or keys over an interface.

Similarly, the relay-proxy may also be configured or instructed via an interface which certificate authority or authorities it should use to verify the connections to clients and servers.

Figure 9:
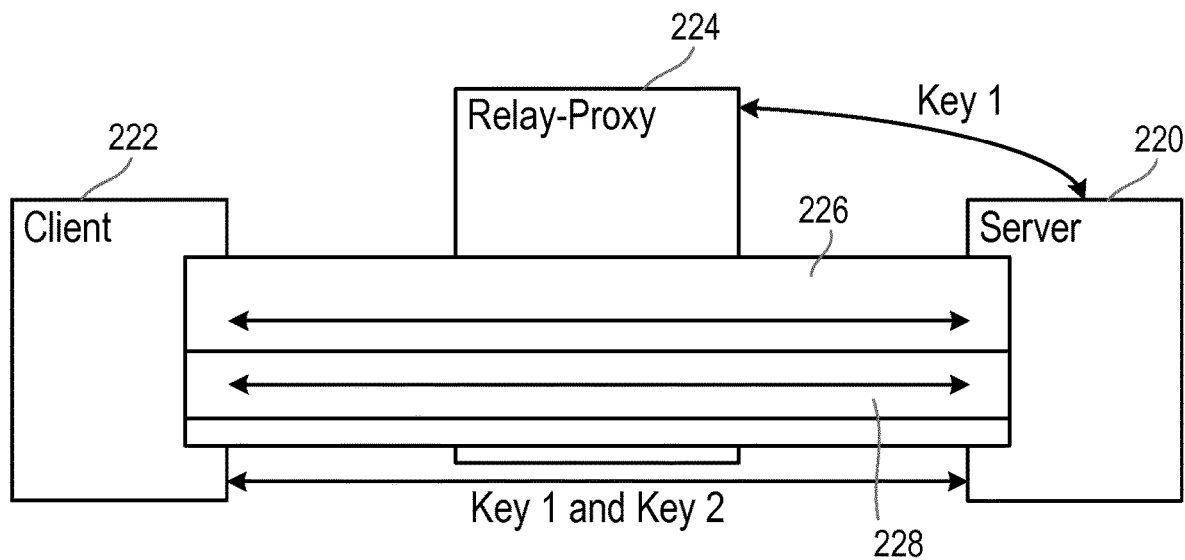
FIG. 9 illustrates data transport between a relay-proxy device and two end point devices.

FIG. 9 shows an example of how data can be sent using the encrypted multi-layered transport, in a situation where the server 220, which may for example be an origin server in a situation where HTTP is being used, has shared two keys (Key 1 and Key 2) with the client 222, while the server 220 has shared only one of these keys (Key 1) with the relay-proxy device 224.

The traffic flow between the server 220 and the client 222 comprises a first part 226 that is encrypted with key material that is also available to the relay-proxy device 224 (for example Key 1 in the example illustrated in FIG. 9). The traffic flow also comprises a second part 228 that is encrypted with key material that is only available to the server 220 and the client 222, and not to the relay-proxy device 224 (for example Key 2 in the example illustrated in FIG. 9). The second part 228 of the traffic flow may also be encrypted with Key 1, so that it can only be decrypted by an entity that has both keys.

Thus, the relay-proxy device 224 can only access any data in the first part 226 of the traffic flow.

For example, the transport relay-proxy may be able to observe the different flows comprising the entire application connection as well as the priority order of the given flows. The priority and flow information can be conveyed to a link layer scheduler in order to perform scheduling on a sub-flow level. Thus, the transport relay-proxy allows the network operator to get insight into an application flow and its corresponding sub-flows.

The functionality of the relay-proxy depends on which elements of the traffic it has been enabled to decrypt.

Based on its access to the data in the first part 226 of the traffic flow, the relay-proxy can perform any desired management functions that are possible based on the elements of the traffic that it has been enabled to decrypt, of which the following are non-limiting examples:

active queue management (AQM) based connection management, flow control, enabling mobile network resource management such as identifying different parts of the traffic flows and exposing this information to the mobile network, traffic logging and analysis, network policy enforcement such zero rating or bandwidth shaping of application traffic, one example being dropping higher bit rate representations of Dynamic Adaptive Streaming over HTTP (DASH) video.

Meanwhile, the relay-proxy device 224 must forward packets of data in the second part 228 of the traffic flow without decryption.

For example, the information that is determined to be critical for the end-to-end service to operate as intended, and that may therefore be sent in such a way that it is not manipulate and/or read by the relay-proxy device 224, may include flow and congestion control signalling fields, such as acknowledgements and window updates.

In some cases, the relay-proxy device 224 decrypts the data packets in the first part 226 of the traffic flow (in the decryption/encryption module 108 shown in FIG. 4, for example), examines the data packets as described below, then re-encrypts those decrypted data packets from the first part 226 of the traffic flow (also in the decryption/encryption module 108 shown in FIG. 4, for example), and transmits the re-encrypted data packets from the first part 226 of the traffic flow to their intended destination. When the relay-proxy device 224 is to re-encrypt previously decrypted data packets from the first part 226 of the traffic flow, it must be provided with the required keying material used by the sending end point for the re-encryption, as well as the key required for the decryption.

In other cases, the relay-proxy device 224 decrypts the data packets in the first part 226 of the traffic flow (in the decryption/encryption module 108 shown in FIG. 4, for example), examines the data packets as described below, and then terminates that first part 226 of the traffic flow. For example, one of the end points may include data that is intended to be read by the relay-proxy device 224 only, and such data does not need to be forwarded to the other end point.

The first part 226 and the second part 228 of the traffic flow may be parts of a single stream, or may be separate streams.

As already mentioned, it is important to keep users' confidentiality, privacy and data integrity intact. In order to achieve this, the transport protocol may encrypt not only the payload but also the protocol header field to avoid unwanted manipulation of the transport characteristics. The QUIC protocol is an example of such a transport protocol, with a built-in encryption functionality. The entire QUIC payload is encrypted and the protocol header file is authenticated.

This means that an application layer proxy is unable to examine not only the payload but also certain header fields.

As described herein, multilayer encryption and integrity protection are used. Thus, the server sends multiple keys and integrity protection data (for example Key 1 and Key 2 in the example of FIG. 9) to the client to encrypt and protect different protocol header fields. The server then configures the relay-proxy and allows it to decrypt certain parts of the protocol header fields (namely those encrypted with Key 1 in the example of FIG. 9), some of which will be sent onwards, in which case they are re-encrypted using the key or keys provided to the relay-proxy. Hence, the transport protocol produces data encrypted with several keys and integrity protections.

Figure 10:
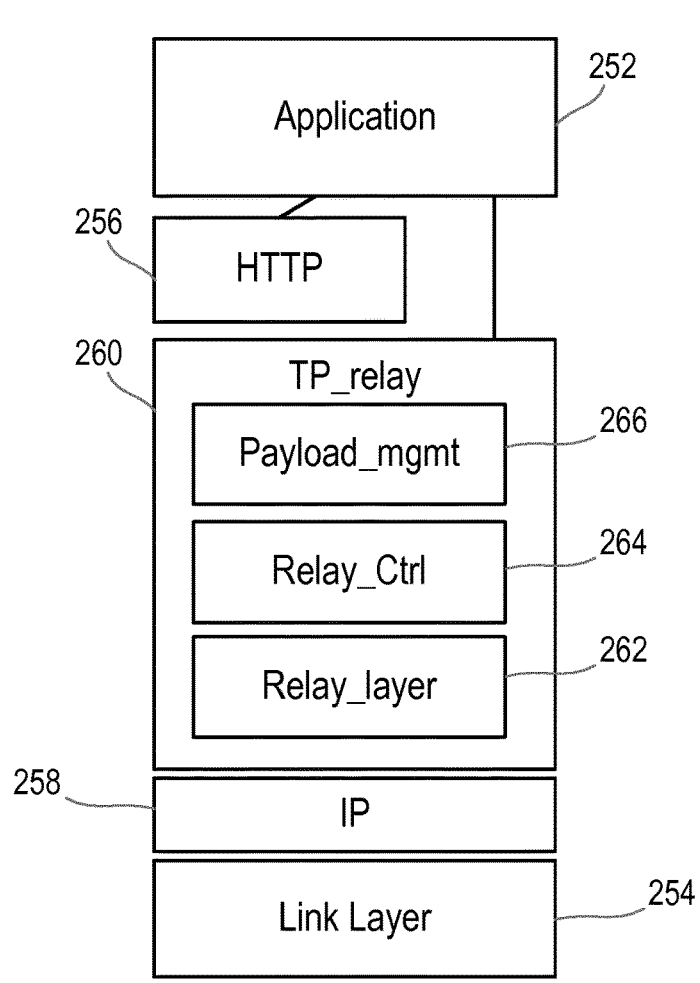
FIG. 10 illustrates one aspect of a relay-proxy device.

FIG. 10 illustrates a more specific example of a relay-proxy device 250, to be included in the exchange of data between a HyperText Transfer Protocol (HTTP) client and server, called an origin server. The intent is to enable the relay-proxy to get an insight into, and to have restricted access to, the flow of HTTP requests and response messages exchanged and transported inside the payload of transport packets, such as QUIC packets. With this information, it may interact with other functionality such as application layer 252 or link layer 254 procedures to assist the client and origin server in their exchange of data, or may provide network management functions such as policing, traffic management, or pricing.

The application layer 252 is connected to a HTTP layer 256, and the link layer 254 is connected to an IP layer 258.

The relay-proxy 250 also has a transport module 260, providing functionality for acting as a transport layer endpoint (for example when the relay-proxy 250 is intended to terminate the first part of a traffic flow) as well as the transport-relay role. The relay-mode functionality has three parts, namely a relay layer 262, a relay control module 264 and a payload management module 266.

The relay layer 262 provides functionality to relay transport messages or parts thereof from ingress to egress points, and hence between first and second end points.

The relay control module 264 provides functionality to control the relay layer, for instance for routing of transport messages or determining which parts of a transport message should be terminated. This layer can interact with external actors via extended transport protocol control signalling dedicated for relay control, or by an Application Programming Interface (API) to an external entity, such as the HTTP layer.

The payload management module 266 analyses the traffic flowing thorough the relay-proxy and informs users and/or subscribing applications about different events. It may also manage the payload itself of transport messages such as shape specific streams as per instruction.

The relay-proxy may communicate with external entities such as the origin server via an API or via in-band signalling in the transport messages and a combination thereof. If the API is used, application layer protocols such as HTTP or JavaScript Object Notation (JSON) can be used.

In the case of transport protocols that use a frame structure, in-band signalling can be enabled by a dedicated frame type. Such a frame would be encrypted using the key shared with the relay proxy.

Figure 11:
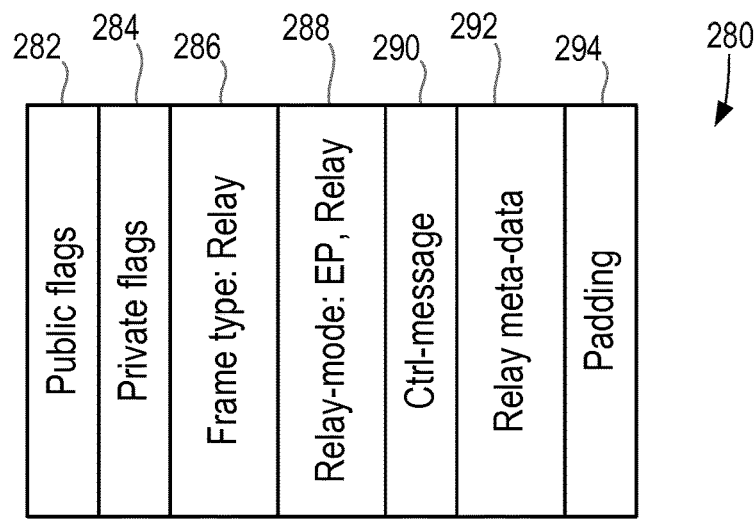
FIG. 11 illustrates a form of a frame.

FIG. 11 shows an example packet 280 containing a relay-frame. The packet contains public flags 282, private flags 284, a frame type field 286 indicating that the packet contains a relay frame, a relay-mode field 288 that indicates whether the frame is intended for an end point or is a relay frame, a control message part 290, relay meta-data 292 and padding bits 294.

If the relay-proxy adds information in the control-message part 290, the packet integrity needs to be recalculated. A packet containing relay control messages should not contain any other frames types than the relay frame and padding frames. Relay frames should be safe to ignore by end points.

Figure 12:
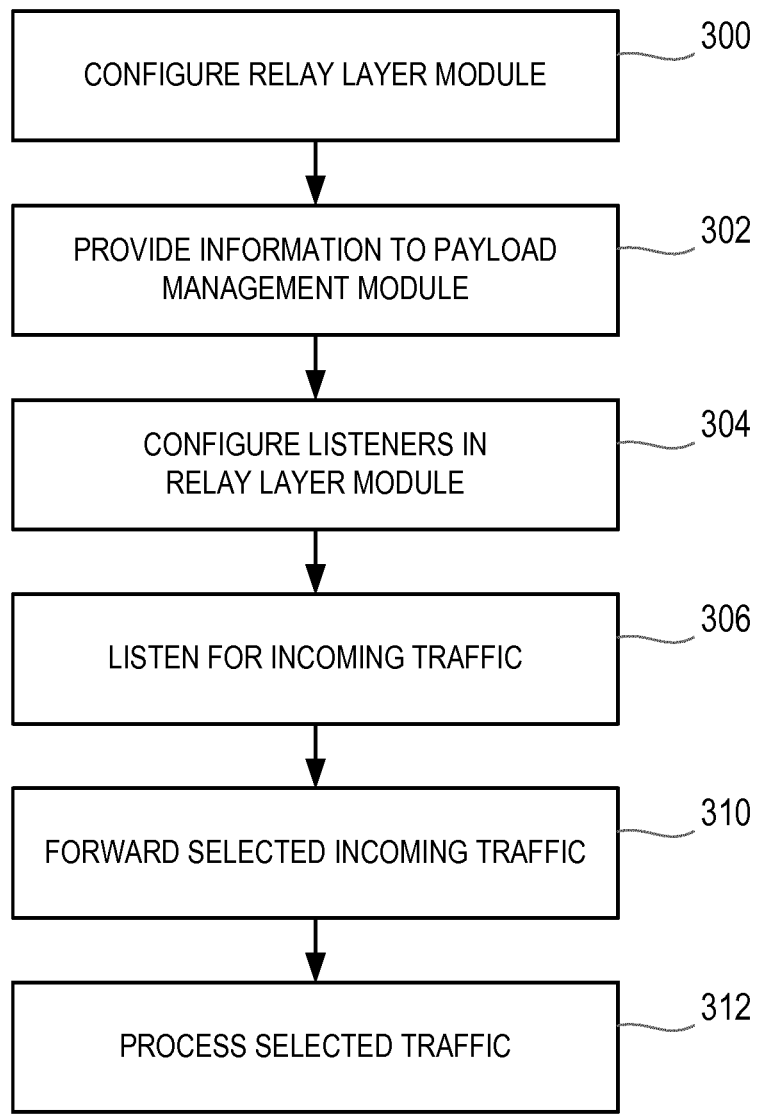
FIG. 12 is a flow chart, illustrating a method of operation of a relay-proxy device.

FIG. 12 is a flow chart, illustrating one example operation of a relay-proxy such as the relay-proxy 250.

In step 300, the relay control module 264 configures the relay layer module 262. For example, the relay control module 264 informs the relay layer module 262 which flows are to be decrypted, processed and re-encrypted and which flows are to be forwarded transparently. For the flows that are to be processed, the appropriate keys for decrypting and re-encrypting are provided. The flows that are to be processed can be forwarded to the payload management module 266.

In step 302, the payload management module 266 is provided with information regarding:
what kind of treatment it should perform on flows passing it;
the traffic events that it should require the relay layer module to look for in the traffic and report to the payload manager; and
how and where to send traffic event information on an external interface.

In step 304, the payload management module 266 configures listeners in the relay layer module 262 for traffic events.

In step 306, the relay layer module listens to the interfaces for incoming traffic.

In step 308, as traffic arrives on an incoming interface, the relay layer module 262 forwards it directly to an outgoing interface to payload manager based on rules such as: if a relay mode frame is present, and if the relay mode node identifier matches a specified string.

In step 310, based on its configuration, the relay layer module 262 processes transport protocol messages/frames. Thus, a session identifier may identify a session. The relay module terminates the encryption tunnel using a key or keys received out-of-band, and establishes a new encryption tunnel to the target end point. The relay module then relays messages to target the target end point or a subsequent relay.

Meanwhile, the relay module gathers and exposes information about frame traffic according to rules to application. It may forward selected traffic to the payload management module 266 for traffic management processing such as shaping. It may append new frames to upstream relay nodes or end points according to configuration rules. And, it notifies traffic events to the payload management module 266 as required.

Figure 13:
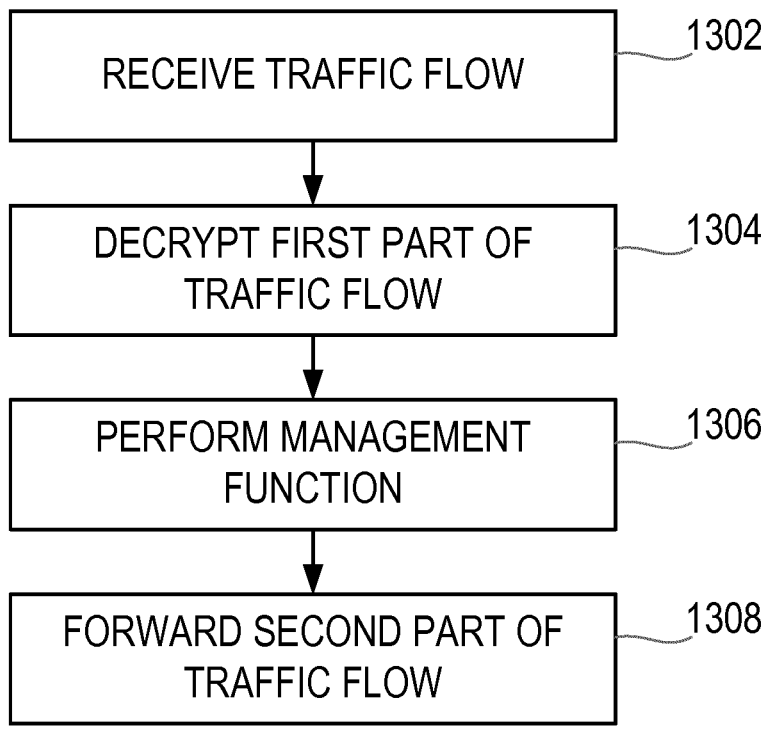
FIG. 13 is a flow chart, illustrating a further method of operation of a relay-proxy device.

FIG. 13 is a flow chart illustrating a method performed in a relay-proxy device.

Figure 14:
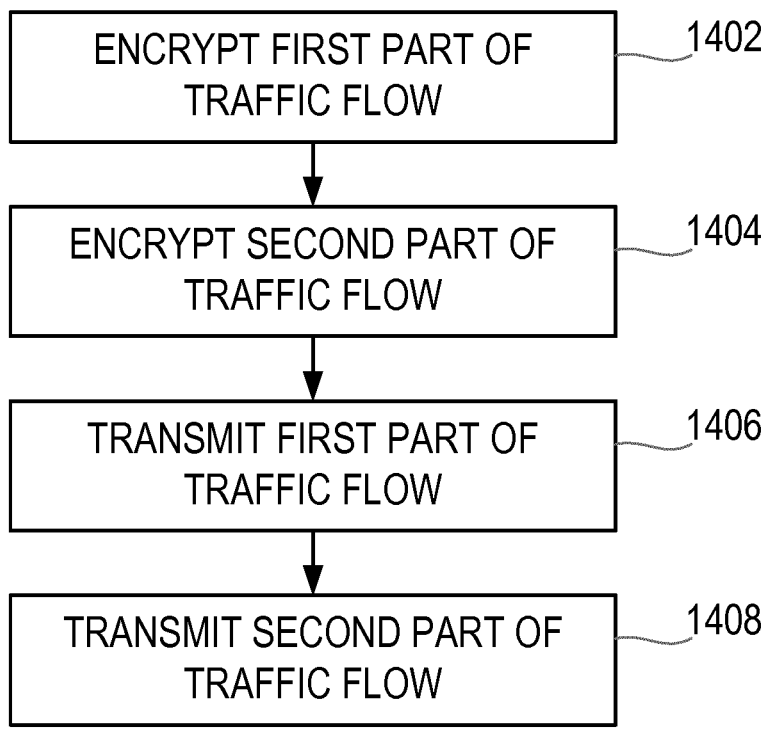
FIG. 14 is a flow chart, illustrating a method of operation of a network node.

FIG. 14 is a flow chart illustrating a method performed in a network node.

Figure 15:
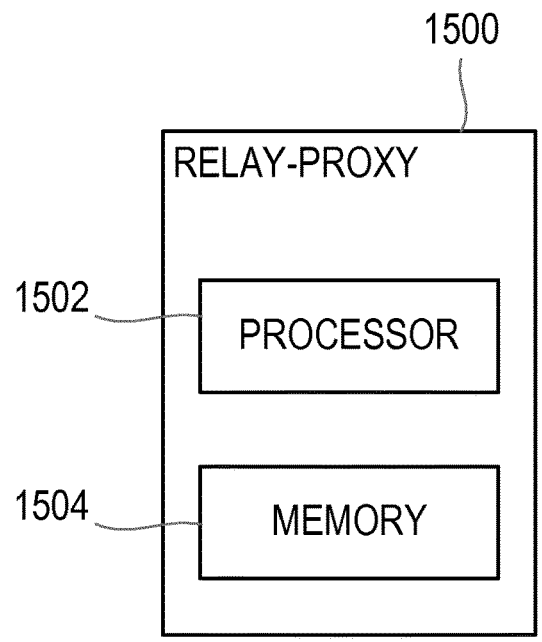
FIGS. 15-17 are block diagrams illustrating embodiments of relay-proxy devices.

FIG. 15 illustrates a relay-proxy device according to some embodiments. Specifically, FIG. 15 shows a relay-proxy device 1500 that can be adapted or configured to operate according to one or more of the non-limiting example embodiments described. The relay-proxy device 1500 comprises a processor or processing unit 1502 that controls the operation of the relay-proxy device 1500. The relay-proxy device 1500 also comprises a memory or memory unit 1504 that is connected to the processing unit 1502 and that contains instructions or computer code executable by the processing unit 1502 and other information or data required for the operation of the relay-proxy device 1500 in accordance with the methods described herein.

Figure 16:
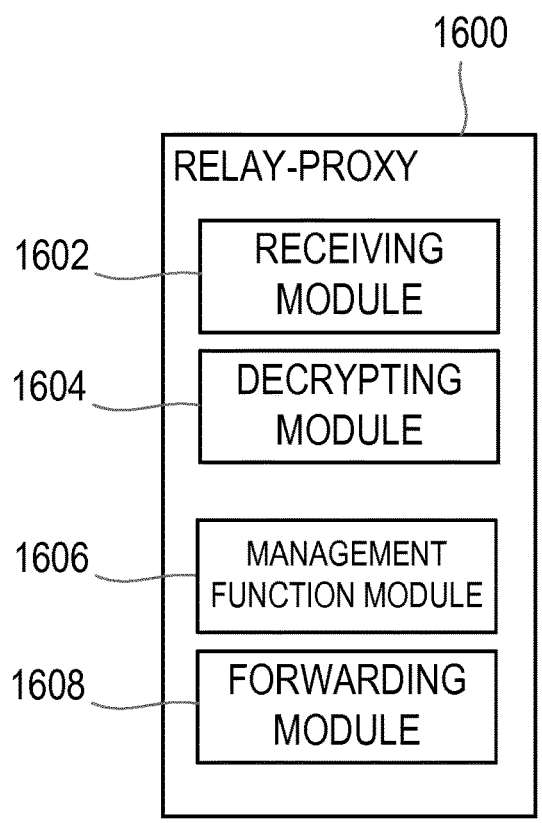

FIG. 16 illustrates a relay-proxy device according to some embodiments. It will be understood that the modules illustrated in FIG. 16 are software implemented functional units, and may be realised in any appropriate combination of software modules. A relay-proxy device 1600 has first and second interfaces allowing connection to a first node and a second node respectively, and is configured with at least one key. The relay-proxy device 1600 then has a receiving module 1602 for receiving a traffic flow in an encrypted transport protocol on the first interface, and a decrypting module 1604 for decrypting a first part of the traffic flow with said key, wherein a second part of the traffic flow cannot be decrypted with said key. The relay-proxy-device 1600 then has a management function module 1606 for performing a management function based on a content of the decrypted first part of the traffic flow. The relay-proxy device also has a forwarding module 1608 for forwarding at least the second part of the encrypted traffic flow to the second interface.

Figure 17:
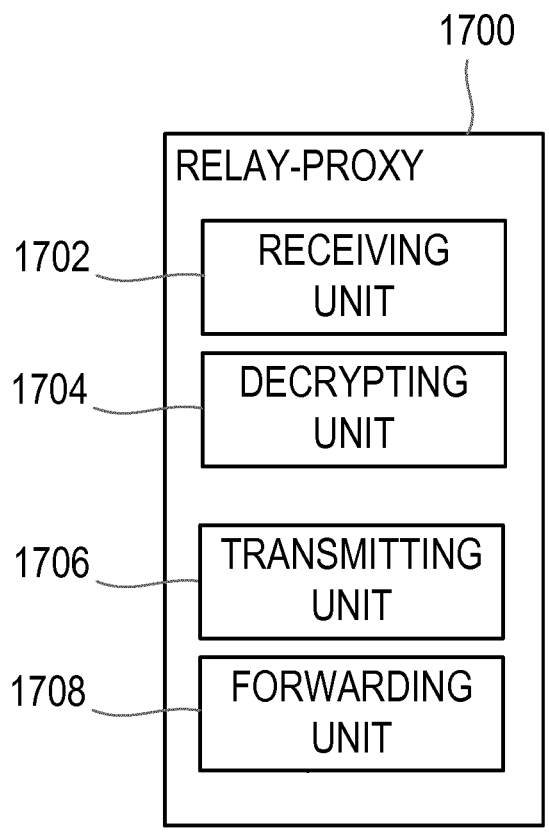

FIG. 17 illustrates a relay-proxy device according to some embodiments. It will be understood that the units illustrated in FIG. 17 are hardware implemented functional units, and may be realised in any appropriate combination of hardware units. A relay-proxy device 1700 has first and second interfaces allowing connection to a first node and a second node respectively, and is configured with at least one key. The relay-proxy device 1700 then has a receiving unit 1702 for receiving a traffic flow in an encrypted transport protocol on the first interface, and a decrypting unit 1704 for decrypting a first part of the traffic flow with said key, wherein a second part of the traffic flow cannot be decrypted with said key. The relay-proxy-device 1700 then has a management function unit 1706 for performing a management function based on a content of the decrypted first part of the traffic flow. The relay-proxy device also has a forwarding unit 1708 for forwarding at least the second part of the encrypted traffic flow to the second interface.

Figure 18:
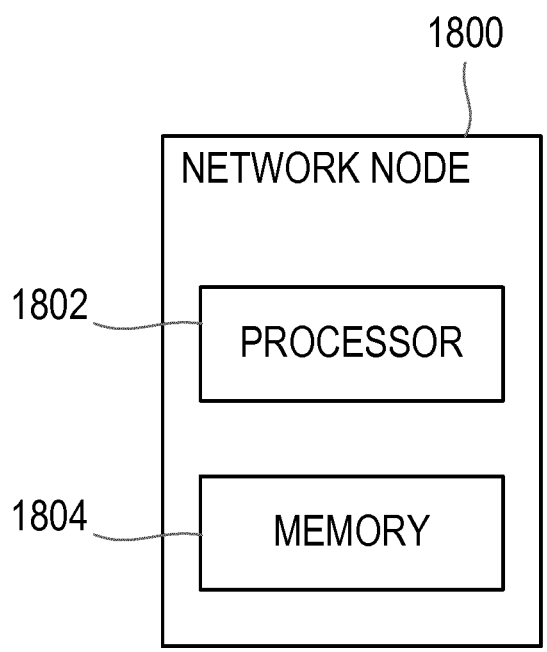
FIGS. 18-20 are block diagrams illustrating embodiments of network nodes.

FIG. 18 illustrates a network node according to some embodiments. Specifically, FIG. 18 shows a network node 1800 that can be adapted or configured to operate according to one or more of the non-limiting example embodiments described. The network node 1800 comprises a processor or processing unit 1802 that controls the operation of the network node 1800. The network node 1800 also comprises a memory or memory unit 1804 that is connected to the processing unit 1802 and that contains instructions or computer code executable by the processing unit 1802 and other information or data required for the operation of the network node 1800 in accordance with the methods described herein.

Figure 19:
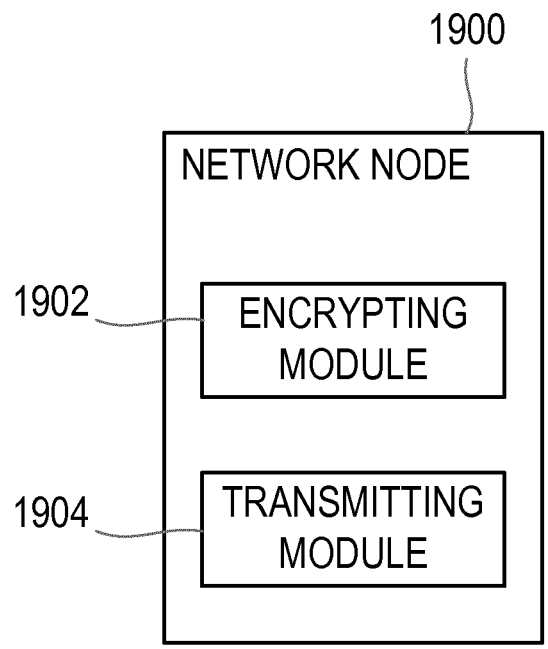

FIG. 19 illustrates a network node according to some embodiments. It will be understood that the modules illustrated in FIG. 19 are software implemented functional units, and may be realised in any appropriate combination of software modules. The first network node 1900 is part of a communication system further comprising a second node, and a relay-proxy device connected between the first node and the second node. The first network node has an encrypting module 1902, for encrypting the first part of the traffic flow with a first encryption key and encrypting the second part of the traffic flow with a second encryption key. The first network node 1900 also has a transmitting module 1904, for: transmitting a first part of a traffic flow from the first node through the relay-proxy device to the second node in an encrypted form, wherein the relay-proxy device is configured with at least one key for decryption of the first part of the traffic flow; and transmitting a second part of the traffic flow from the first node through the relay-proxy device to the second node, wherein the traffic flow is in an encrypted transport protocol such that the relay-proxy device is unable to decrypt the second part of the traffic flow.

Figure 20:
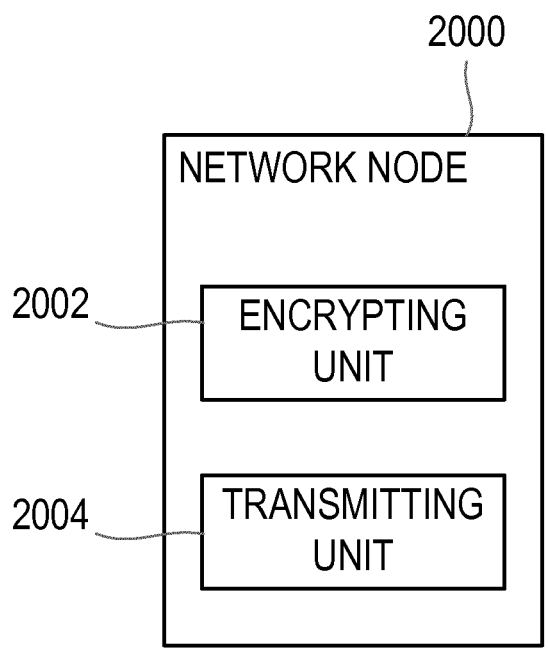

FIG. 20 illustrates a network node according to some embodiments. It will be understood that the units illustrated in FIG. 20 are hardware implemented functional units, and may be realised in any appropriate combination of hardware units. The first network node 2000 is part of a communication system further comprising a second node, and a relay-proxy device connected between the first node and the second node. The first network node has an encrypting unit 2002, for encrypting the first part of the traffic flow with a first encryption key and encrypting the second part of the traffic flow with a second encryption key. The first network node 2000 also has a transmitting unit 2004, for: transmitting a first part of a traffic flow from the first node through the relay-proxy device to the second node in an encrypted form, wherein the relay-proxy device is configured with at least one key for decryption of the first part of the traffic flow; and transmitting a second part of the traffic flow from the first node through the relay-proxy device to the second node, wherein the traffic flow is in an encrypted transport protocol such that the relay-proxy device is unable to decrypt the second part of the traffic flow. There is thus described a system and a method for including a transport-relay function in the exchange of data between two nodes such as a client and a server, without the nodes having to relinquish control of the transport protocol flow and congestion control, with the transport-relay function having visibility on the traffic pattern between the nodes and exposing this to other layers such as application and link layers and performing network management functions such as shaping and policing.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A relay-proxy device comprising a processor and a memory, the memory containing instructions executable by the processor, such that the relay-proxy device is configured to:
   receive a traffic flow in an encrypted transport protocol on a first interface of the relay-proxy device, wherein the first interface allows connection to a first node;
   decrypt a first part of the traffic flow with at least one key with which the relay-proxy device is configured, wherein a second part of the traffic flow cannot be decrypted with said at least one key;
   perform a management function based on a content of the decrypted first part of the traffic flow; and
   forward at least the second part of the traffic flow to a second interface of the relay-proxy device, wherein the second interface allows connection to a second node.

2. The relay-proxy device as claimed in claim 1 further configured to:
   re-encrypt the first part of the traffic flow with said at least one key; and
   forward the re-encrypted first part of the traffic flow to the second interface.

3. The relay-proxy device as claimed in claim 1 further configured to terminate the first part of the traffic flow, wherein the relay-proxy device is configured to forward only the second part, not the first part, of the traffic flow to the second interface of the relay-proxy device.

4. The relay-proxy device as claimed in claim 1 wherein the relay-proxy device is configured with the at least one key by requesting the at least one key from one of the first node and second node.

5. The relay-proxy device as claimed in claim 1 wherein the first node is a client node and the second node is an origin server.

6. The relay-proxy device as claimed in claim 1 wherein the traffic flow received on the first interface is all traffic from the first node to the second node.

7. The relay-proxy device as claimed in claim 1 wherein the traffic flow received on the first interface is at least a part of traffic from the first node to the second node.

8. The relay-proxy device as claimed in claim 1 wherein the relay-proxy device is configured with a plurality of keys, and wherein the relay-proxy device is further configured to:
decrypt parts of the first part of the traffic flow with said plurality of keys.

9. The relay-proxy device as claimed in claim 1 wherein the at least one key has a predetermined life span.

10. The relay-proxy device as claimed in claim 1 further configured to append new frames to the traffic flow.

11. The relay-proxy device of claim 1, wherein the first part of the traffic flow and the second part of the traffic flow comprise different fields of the encrypted transport protocol.

12. The relay-proxy device of claim 1, wherein the second part of the traffic flow is encrypted with a separate set of one or more keys which is separate from a transport protocol security session associated with the traffic flow, wherein the at least one key with which the first part of the traffic flow is decrypted is included in the transport protocol security session, and wherein the relay-proxy device is not configured with the separate set of one or more keys.

13. A method of operation of a relay-proxy device, wherein the relay-proxy device has first and second interfaces allowing connection to a first node and a second node respectively, and wherein the relay-proxy device is configured with at least one key, the method comprising:
receiving a traffic flow in an encrypted transport protocol on the first interface;
decrypting a first part of the traffic flow with said at least one key, wherein a second part of the traffic flow cannot be decrypted with said at least one key;
performing a management function based on a content of the decrypted first part of the traffic flow; and
forwarding at least the second part of the traffic flow to the second interface.

14. The method as claimed in claim 13 further comprising:
re-encrypting the first part of the traffic flow with said at least one key; and
forwarding the re-encrypted first part of the traffic flow to the second interface.

15. A first network node configured for use in a communication system further comprising a second node and a relay-proxy device connected between the first node and the second node, the first network node comprising a processor and a memory, the memory containing instructions executable by the processor, such that the first network node is configured to:
transmit a first part of a traffic flow from the first node through the relay-proxy device to the second node in an encrypted form, wherein the relay-proxy device is configured with at least one key for decryption of the first part of the traffic flow; and
transmit a second part of the traffic flow from the first node through the relay-proxy device to the second node, wherein the traffic flow is in an encrypted transport protocol such that the relay-proxy device is unable to decrypt the second part of the traffic flow.

16. The first network node as claimed in claim 15, configured to encrypt the first part of the traffic flow with a first encryption key and encrypt the second part of the traffic flow with a second encryption key.

17. The first network node as claimed in claim 16, further configured to:
send a first key to the relay-proxy device to allow decryption of the first part of the traffic flow; and
refrain from sending to the relay-proxy device a second key that allows decryption of the second part of the traffic flow.

18. The first network node as claimed in claim 17, further configured to:
send a first key and a second key to the second node to allow decryption of the first and second parts of the traffic flow.

19. The first network node as claimed in claim 18, wherein the first key and/or the second key has a predetermined life span.

20. The first network node as claimed in claim 15, wherein the first network node is an origin server.

21. The first network node of claim 15, wherein the first part of the traffic flow and the second part of the traffic flow comprise different fields of the encrypted transport protocol.

22. The first network node of claim 15, wherein the second part of the traffic flow is encrypted with a separate set of one or more keys which is separate from a transport protocol security session associated with the traffic flow, wherein the at least one key for decryption of the first part of the traffic flow is included in the transport protocol security session, and wherein the first network node does not provide the separate set of one or more keys to the relay-proxy device.

23. A method of operation of a first network node in a communication system further comprising a second node and a relay-proxy device connected between the first node and the second node, the method comprising:
transmitting a first part of a traffic flow from the first node through the relay-proxy device to the second node in an encrypted form, wherein the relay-proxy device is configured with at least one key for decryption of the first part of the traffic flow; and
transmitting a second part of the traffic flow from the first node through the relay-proxy device to the second node, wherein the traffic flow is in an encrypted transport protocol such that the relay-proxy device is unable to decrypt the second part of the traffic flow.

24. The method as claimed in claim 23, comprising encrypting the first part of the traffic flow with a first encryption key and encrypting the second part of the traffic flow with a second encryption key.

* * * * *